Patented May 6, 1930

1,757,501

UNITED STATES PATENT OFFICE

JAMES BADDILEY, OF BLACKLEY, MANCHESTER, ENGLAND, ASSIGNOR TO BRITISH DYESTUFFS CORPORATION LIMITED, OF BLACKLEY, MANCHESTER, ENGLAND

APPLICATION OF SECONDARY DISAZO DYES

No Drawing. Application filed May 21, 1927, Serial No. 193,388, and in Great Britain December 13, 1926.
Renewed September 6, 1929.

This invention relates to a process for dyeing regenerated cellulose materials with the secondary disazo dyestuffs obtained by combining the diazo compound obtained from a nitroaniline or a homologue or derivative thereof not containing a sulphonic or carboxylic acid group with any middle component, rediazotizing and combining with a periaminonaphthol sulphonic acid, including the N-substitution product of the latter in this term. These dyes may be represented by the general formula

wherein $R_6$ represents a divalent aryl residue free from sulphonic and carboxylic groups, $R_2$ represents a divalent aryl residue and $R_4$ represents a coupled 1:8-amino naphthol sulphonic acid. The nitro dyestuffs so obtained may be used directly for dyeing or the nitro group may be reduced with a suitable agent, for example, sodium sulphide, and the reduced dyestuffs used for dyeing. The process of dyeing regenerated cellulose by means of these dyes in which the nitro group has been reduced to an amino group and the dye products so produced are claimed in my copending divisional application Ser. No. 360,314. I have found that the new dyestuffs generally possess the property of dyeing regenerated cellulose silks, such as viscose silks, in level shades. In certain cases they may also be used for dyeing cotton, the dyeings being capable of diazotization and development on the fibre.

In the following directions, the parts are by weight:

138 parts of para-nitroaniline are diazotized in the usual way and combined with 223 parts of the technical mixture of 1-naphthylamine-6 and 7-sulphonic acids in the presence of sodium acetate, at about 10° C. When combination is complete, the mixture is made strongly acid to Congo red by addition of hydrochloric acid and rediazotized with about 69 parts of sodium nitrite, the mixture throughout being acid to Congo red. When diazotization is complete, the mixture is added gradually to an ice-cold alkaline solution of 1:8-aminonaphthol-4-sulphonic acid, containing sufficient sodium carbonate to keep the coupling mixture alkaline throughout. Coupling occurs rapidly and after completion the mixture is heated, the dyestuff isolated by addition of common salt, filtered off and dried. It dyes regenerated cellulose silks a dull blue shade, the dyeings obtained being level.

138 parts of para-nitroaniline are diazotized in the usual way and combined in mineral acid solution with 137 parts of meta-amino-para-cresol methyl ether at about 10° C. by stirring overnight. The mixture is then heated to about 30° C. and rediazotized by addition of a further amount of hydrochloric acid and 69 parts of sodium nitrite, the mixture throughout being acid to Congo red. When diazotization is complete, the diazo suspension is cooled with ice and added gradually to an ice-cold alkaline solution of 319 parts of 1:8-aminonaphthol-3:6-disulphonic acid containing sufficient caustic soda or sodium carbonate to maintain the mixture alkaline throughout the coupling. When combination is complete about 360 parts of sodium sulphide crystals are added and the mixture stirred overnight at room temperature, during which time the nitro group is completely reduced. The mixture is then heated up, made neutral to litmus by addition of hydrochloric acid and the dyestuff isolated by addition of common salt, filtered off and dried. It dyes viscose silk a level greenish-black shade.

The dyestuffs may be applied to fabrics of cotton or of artificial silks containing regenerated cellulose, such as viscose silks, in the usual way. For example a dyebath may be made up from 6 parts of the dyestuff given at the bottom of the table below and 3,000 parts of water. 100 parts of viscose silk are entered into the bath which is then heated to boiling temperature. 30 parts of Glauber's salt or common salt are then added and the dyeing continued for ½ hour at or nearly at a boiling temperature. Soap may be added to the dyebath if desired. The viscose silk is dyed a full black shade, which may be modified by diazotization on the fibre and development with $m$-toluylenediamine, whereby the fastness to washing and to acids is increased.

Examples of dyes to which my invention is applicable are quoted in the following table:

| Secondary disazo colours from: | | | Nitro groups reduced or not reduced | Shade on viscose silk |
| --- | --- | --- | --- | --- |
| First component | Middle component | End component (coupled in alkaline solution) | | |
| p-nitroaniline | p-xylidine | 1:8-aminonaphthol | Reduced | Brownish-black |
| Do. | m-toluidine | Do. | Reduced | Brownish-black |
| p-nitroaniline | meta-amino-p-cresol, methyl ether | 1-acetylamino-8-naphthol 3:6-disulphonic acid | Reduced | Olive-black |
| Do. | Do. | 1:8-aminonaphthol-2:4-disulphonic acid | Reduced | Black |
| p-nitroaniline | Naphthylamine | 1:8-aminonaphthol-3:6-disulphonic acid | Reduced | Olive-black |
| m-nitroaniline | Meta-amino, para-cresol methyl ether | Do. | Reduced | Brownish-black |
| o-chloro-p-nitroaniline | Do. | Do. | Reduced | Greenish-black |
| Do. | Do. | 1:8 - aminonaphthol - 4 - sulphonic acid | Reduced | Grey-black |
| m-amino-p-toluidine | Do. | 1:8-aminonaphthol-3:6-disulphonic acid | Reduced | Black |
| 4-nitro-o-anisidine | Do. | Do. | Reduced | Black |
| p-nitroaniline | Do. | Do. | Not reduced | Blue-black |

What I claim and desire to secure by Letters Patent is:—

1. The process of dyeing regenerated cellulose material in level shades which comprises immersing the material in a bath containing a dye obtained by coupling a diazotized nitroaryl amine free from sulphonic and carboxylic groups with a middle component, rediazotizing and coupling with a sulphonated periaminonaphthol in alkaline solution.

2. Regenerated cellulose materials dyed with dyes obtained by coupling a diazotized nitroaryl amine, free from sulphonic and carboxylic groups with a middle component, rediazotizing and coupling with a sulphonated periaminonaphthol in alkaline solution.

3. The process of dyeing regenerated cellulose materials in even level shades which comprises applying to said regenerated cellulose material secondary disazo dyes having the general formula $$O_2N-R_6-N=N-R_2-N=N-R_4$$

wherein $R_6$ represents a divalent aryl residue free from sulphonic and carboxylic groups, $R_2$ represents a divalent aryl residue and $R_4$ represents a coupled 1:8-aminonaphthol sulphonic acid.

4. The process of dyeing regenerated cellulose materials in even, level shades which comprises applying to said regenerated cellulose materials secondary disazo dyes having the general formula $$O_2N-R_7-N=N-R_2-N=N-R_4$$

wherein $R_7$ represents a divalent monocyclic aryl residue free from sulphonic and carboxylic groups, $R_2$ represents a divalent aryl residue and $R_4$ represents a coupled 1:8-(aminonaphthol sulphhonic acid and in which the $O_2N$ group is attached to the $R^7$ in the para position to the azo group.

5. The process of dyeing regenerated cellulose materials in even, level shades which comprises applying to said regenerated cellulose materials secondary disazo dyes having the general formula $$O_2N-R_8-N=N-R_2-N=N-R_4$$

wherein $R_8$ represents a divalent monocyclic aryl residue or the chloro, alkyl or alkoxy derivatives of such residue, the said aryl represented by $R_8$ being free from sulphonic and carboxylic groups, $R_2$ represents a divalent aryl residue and $R_4$ represents a coupled 1:8-aminonaphthol sulphonic acid and in which the $O_2N$ group is attached to the $R_8$ in the para position to the azo group.

6. The process of dyeing regenerated cellulose materials in even, level shades which comprises applying to said regenerated cellulose materials secondary disazo dyes having the general formula

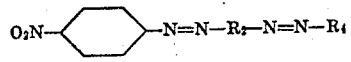

wherein $R_2$ represents a divalent aryl residue and $R_4$ represents a coupled 1:8-aminonaphthol sulphonic acid.

7. The process of dyeing regenerated cellulose materials in even, level shades which comprises applying to the said regenerated cellulose materials secondary disazo dyes having the general formula

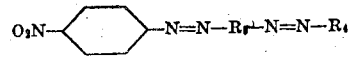

wherein $R_9$ represents a divalent monocyclic alkyl substituted aryl residue and $R_4$ represents a coupled 1:8-aminonaphthol sulphonic acid.

8. The process of dyeing regenerated cellulose materials in even, level shades which comprises applying to said regenerated cellulose materials secondary disazo dyes having the general formula

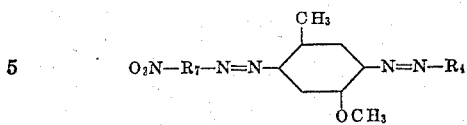

wherein $R_7$ represents a divalent monocyclic aryl residue free from sulphonic and carboxylic groups and $R_4$ represents a coupled 1:8-aminonaphthol sulphonic acid and in which the $O_2N$ group is attached to the $R_7$ in the para position to the azo group.

9. The process of dyeing regenerated cellulose materials in even, level shades which comprises applying to said regenerated cellulose materials secondary disazo dyes having the general formula

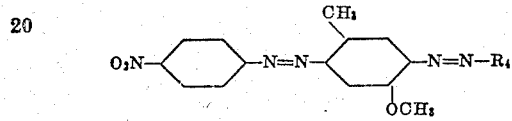

wherein $R_4$ represents a coupled 1:8-amino naphthol sulphonic acid.

10. The process of dyeing regenerated cellulose materials in even, level shades which comprises applying to said regenerated cellulose materials secondary disazo dyes having the probable formula

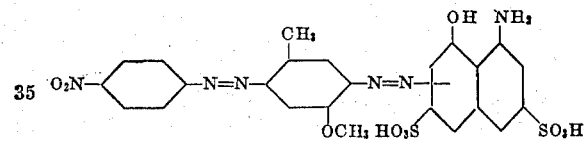

11. Regenerated cellulose materials dyed with secondary disazo dyes having the general formula

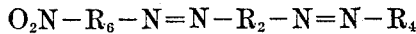

wherein $R_6$ represents a divalent aryl residue free from sulphonic and carboxylic groups, $R_2$ represents a divalent aryl residue and $R_4$ represents a coupled 1:8-amino naphthol sulphonic acid, the said regenerated cellulose material having an even, level shade.

12. Regenerated cellulose materials dyed with secondary disazo dyes having the general formula

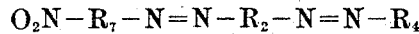

wherein $R_7$ represents a divalent monocyclic aryl residue free from sulphonic and carboxylic groups, $R_2$ represents a divalent aryl residue and $R_4$ represents a coupled 1:8-amino naphthol sulphonic acid and in which the $O_2N$ group is attached to the $R_7$ in the para position to the azo group, the said regenerated cellulose material having an even, level shade.

13. Regenerated cellulose materials dyed with secondary disazo dyes having the general formula

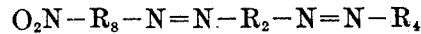

wherein $R_8$ represents a divalent monocyclic aryl residue or the chloro, alkyl or alkoxy derivatives of such residues, the said aryl residue represented by $R_8$ being free from sulphonic and carboxylic groups, $R_2$ represents a divalent aryl residue and $R_4$ represents a coupled 1:8-amino naphthol sulphonic acid and in which the $O_2N$ group is attached to the $R_8$ in the para position to the azo group, the said regenerated cellulose materials having an even, level shade.

14. Regenerated cellulose materials dyed with the secondary disazo dye having the general formula

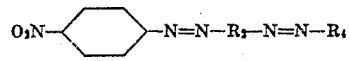

wherein $R_2$ represents a divalent aryl residue and $R_4$ represents a coupled 1:8-amino naphthol sulphonic acid, the said regenerated cellulose material having an even, level shade.

15. Regenerated cellulose materials dyed with the secondary disazo dyes having the general formula

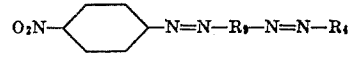

wherein $R_9$ represents a divalent monocyclic alkyl substituted aryl residue and $R_4$ represents a coupled 1:8-amino naphthol sulphonic acid, the said regenerated cellulose materials having an even, level shade.

16. Regenerated cellulose materials dyed with secondary disazo dyes having the general formula

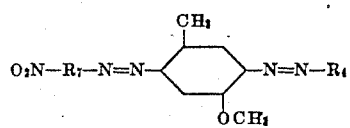

wherein $R_7$ represents a divalent monocyclic aryl residue free from sulphonic and carboxylic groups and $R_4$ represents a coupled 1:8-amino naphthol sulphonic acid and in which the $O_2N$ group is attached to the $R_7$ in the para position to the azo group the said regenerated cellulose materials having an even, level shade.

17. Regenerated cellulose materials dyed with the secondary disazo dyes having the general formula

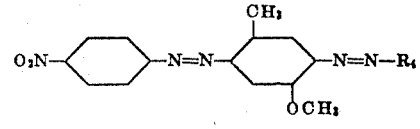

wherein $R_4$ represents a coupled 1:8-amino naphthol sulphonic acid, the said regenerated cellulose material having an even level shade.

18. Regenerated cellulose materials dyed with the secondary disazo dyes having the probable formula
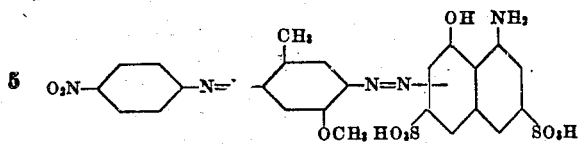
the said regenerated cellulose material having an even, level shade.
In testimony whereof I have signed my name to this specification.
JAMES BADDILEY.